United States Statutory Invention Registration [19]

[11] Reg. Number: H152

Lampe [43] Published: Nov. 4, 1986

[54] RADIOACTIVE WASTE DISPOSAL PACKAGE

[75] Inventor: Robert F. Lampe, Bethel Park, Pa.

[73] Assignee: The United States of America as represented by the United States Department of Energy, Washington, D.C.

[21] Appl. No.: 688,673

[22] Filed: Jan. 4, 1985

[51] Int. Cl.[4] ..... G21C 19/00; G21C 13/00

[52] U.S. Cl. ..... 376/272; 252/633; 250/506.1

[58] Field of Search ..... 376/272, 287–289; 252/628, 633; 250/506.1, 507.1, 515.1

[56] References Cited

U.S. PATENT DOCUMENTS

| | | | |
|---|---|---|---|
| 3,466,444 | 9/1969 | Lusk | 250/506.1 |
| 3,669,299 | 6/1972 | Jones et al. | 220/10 |
| 3,780,309 | 12/1973 | Bochard | 250/507.1 |
| 3,886,368 | 5/1975 | Rollins et al. | 250/507.1 |
| 3,935,467 | 1/1976 | Gablin | 250/507.1 |
| 4,115,311 | 9/1978 | Sump | 252/628 |
| 4,139,488 | 2/1979 | Knotik et al. | 252/633 |
| 4,204,975 | 5/1980 | Thiele | 252/628 |
| 4,209,420 | 6/1980 | Larker | 376/272 |
| 4,229,316 | 10/1980 | Baatz et al. | 252/633 |
| 4,300,056 | 11/1981 | Gagneraud | 250/515.1 |
| 4,491,540 | 1/1985 | Larker et al. | 252/628 |
| 4,535,250 | 8/1985 | Fields | 250/507.1 |

FOREIGN PATENT DOCUMENTS

| | | | |
|---|---|---|---|
| 2856875 | 7/1980 | Fed. Rep. of Germany | 376/272 |
| 2801944 | 7/1979 | Fed. Rep. of Germany | 376/272 |
| 2824240 | 12/1979 | Fed. Rep. of Germany | 376/272 |
| 2106442 | 4/1983 | United Kingdom | 376/272 |

*Primary Examiner*—Deborah L. Kyle
*Assistant Examiner*—Dan Wasil
*Attorney, Agent, or Firm*—Robert Southworth, III; Judson R. Hightower

[57] ABSTRACT

A radioactive waste disposal package comprising a canister for containing vitrified radioactive waste material and a sealed outer shell encapsulating the canister. A solid block of filler material is supported in said shell and convertible into a liquid state for flow into the space between the canister and outer shell and subsequently hardened to form a solid, impervious layer occupying such space.

12 Claims, 4 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

RADIOACTIVE WASTE DISPOSAL PACKAGE

BACKGROUND OF THE INVENTION

This invention relates generally to a waste container and, more particularly, to a container or package for storing radioactive waste materials for long periods of time. The U. S. Government has rights in this invention pursuant to Contract No. E512-06400 between the U. S. Department of Energy and Westinghouse Electric Corporation.

The safe and effective management of radioactive waste is one of the most critical problems facing the nuclear industry today. In view of the many hazards and problems associated with the management of high-level radioactive waste, numerous Federal Regulations have been promulgated and/or are being developed to govern the permanent storage of such waste in containers for burial in suitable repositories that have yet to be selected. A major task resides in the development of a container or comprehensive waste package capable of safely containing such waste in a manner consistent with the above-mentioned regulations. In accordance with these regulations, the waste package, in addition to satisfying radiation, criticality, fire and handling safety requirements, must provide for: (1) positive containment of the radionuclides until the activity of the material decays significantly (estimated at about 1,000 years), (2) the release of radioactive material after the above-mentioned containment period to the geologic setting at a gradual rate sufficiently retarded to permit the barriers provided by the underground location and natural geologic materials to protect man and his environment, and (3) the retrievability of the waste material for a significant period of time (about 150 years) after initial emplacement.

Various attempts have been made to design waste packages meeting the above criteria. Some of these efforts include multi-layered constructions formed of inner and outer shells to minimize the release rate of radionuclides in the event that the outer shell or containment barrier, often referred to as an "overpack", is breached. A serious problem associated with these known multi-layered packaged constructions is that the outer shell or overpack is not adequately supported internally to prevent outer shell deformation resulting from the external pressure loads associated with repository conditions. Also, these known waste packages generally are vulnerable to crushing forces since they lack the necessary compressive strength to resist external pressure loads.

Accordingly, it is a primary object of the present invention to overcome the above noted shortcomings by providing a new and useful self-stabilizing radioactive waste disposal package.

It is another object of this invention to provide a radioactive waste package utilizing the compressive strength of the waste material to resist the external crushing forces resulting from dynamic repository conditions.

It is still another object of the present invention to provide a fully internally supported radioactive waste package preventing deformation to the outer shell of the package.

It is a further object of this invention to provide the foregoing radioactive waste package with a self contained filler completely occupying all spaces and voids between the inner and outer shells of the package.

These and other objects, advantages, and characterizing features of the present invention will become clearly apparent from the ensuing detailed description of an illustrative embodiment thereof, taken together with the accompanying drawings wherein like reference characters denote like parts throughout the various views.

SUMMARY OF THE INVENTION

A waste package comprising a sealed canister for containing radioactive waste material in the form of an inert, insoluble glass product containing radionuclides. The canister is disposed within a sealed shell or container in radially spaced relation thereto and a metallic filler completely occupies the annular space between the canister and the container. The filler material is initially cast in solid form at one end of the canister and subsequently heated to liquefy the filler material for flow into the above mentioned space.

DETAILED DESCRIPTION OF THE PREFERRED EMBODIMENT

Figure 1:
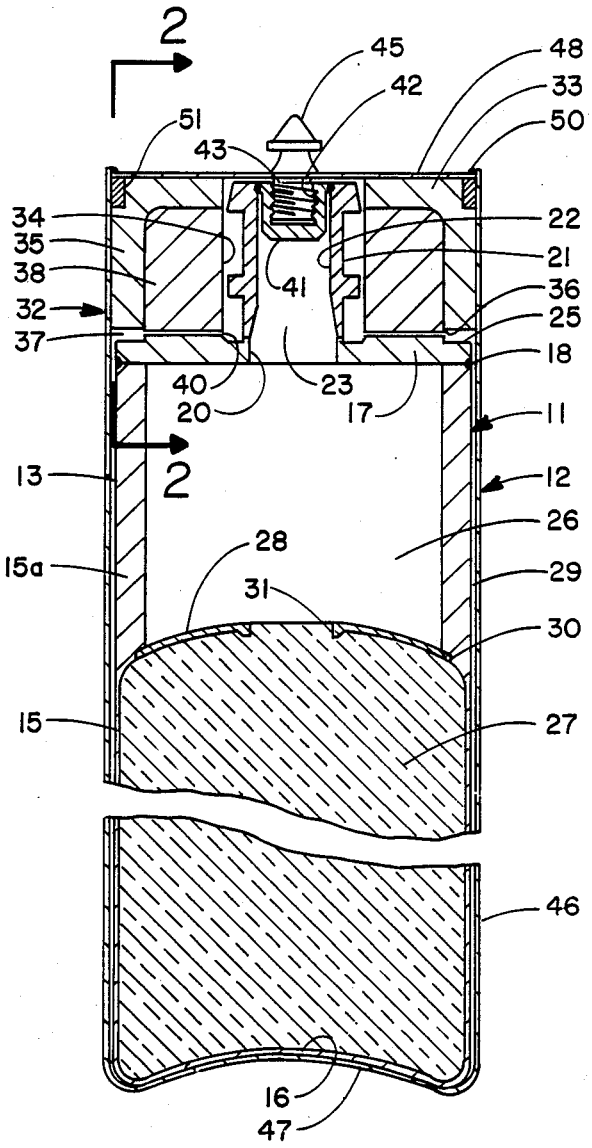
FIG. 1 is a vertical sectional view of a self-stabilizing radioactive waste disposal package constructed in accordance with this invention.

Referring now in detail to the illustrative embodiment depicted in the accompanying drawings, there is shown in FIG. 1 a self stabilized disposal container or package, comprehensively designated 10, adapted to contain and store radioactive waste material including spent nuclear fuel for long periods of time. The package 10 also is constructed in a manner facilitating the manipulation thereof by suitable remote handling apparatus, as well as meeting the criteria for the safe transport of such materials.

As shown in FIG. 1, the waste package 10 comprises an inner, specially reinforced canister 11 completely encapsulated by a corrosion resistant metallic shell 12, often referred to as an "overpack". The reinforced canister 11 is fabricated by welding together the necessary component parts or segments that have been prefabricated from 304 L stainless steel into a cup-shaped, cylindrical body 13 having a cylindrical sidewall 15 and an inwardly dished or concave bottom wall 16 formed integral with the sidewall 15. In lieu of 304 L stainless steel, the canister body 13 can be formed of carbon steel or Ti Code −12 material, if desired, to reduce costs or extend the corrosion life of the canister.

The upper end of canister 11 is provided with a top wall 17 in the form of a thick circular plate welded, as at 18, to the upper end of body 13 and formed with a central opening 20 to provide access to the interior of the canister 11. The canister 11 terminates at its upper end in a neck portion 21 welded or otherwise fixedly secured to top wall 17 adjacent the opening 20. The neck 21 is formed with a throat portion or bore 22 tapering outwardly adjacent its lower end to merge with the opening 20 and form therewith a continuous passage or inlet 23 for the flow of waste material into the interior of canister 11. The upper surface of top wall 17 adjacent the periphery thereof is formed with an annular recess 25 for a purpose that will hereinafter be more fully explained.

A significant feature of this invention resides in strengthening the canister 11 sufficiently to react radial and axial forces generated by external pressure loads. To this end, the upper portion of body 13, which is devoid of waste material to form an empty space or overfill volume 26, is reinforced while the bottom portion of body 13 takes advantage of the waste form to provide the desired reactive compressive strength. Accordingly, the upper portion of body 13 is formed with a wall portion 15*a* of substantially greater thickness than the remainder of wall 15 to reinforce the same. For the same reason, the top wall 17 also has a thickness approximating the thickness of the sidewall portion 15*a*. It should be understood that the length of thickened wall portion 15*a* is determined by and approximates the depth of the unoccupied space 26 to provide the desired reinforcement for this portion of the canister 11.

The bottom portion of body 13 houses the radioactive waste material in the form of glass 27 and retains the glass in a shape that can react external pressure loads even if the glass develops cracks. As is well known, radioactive waste materials can be converted into an inert, solid form by a glass vitrification process in which the radionuclides are contained within the formed glass product. Since this technique is well known, no further description or amplification thereof is believed necessary. However, the canister 11 of the present invention advantageously utilizes this glass form of radioactive waste to enhance the compressive strength of the canister 11.

In order to retain the shape of the glass, an internal stiffener, in the form of a concave disk 28, is provided at the top of the waste glass 27. The stiffener disk 28 is welded or otherwise fixedly secured along its peripheral edge 30 to the lower portion of the thickened wall portion 15*a* and is formed with a central opening 31 to pass the molten waste glass therethrough during the canister filling operation. This stiffener, in conjunction with the canister sidewall 15 and bottom wall 16, serves to structurally encapsulate or confine the entire body of waste glass. This encapsulated glass, even if cracked, possesses high compressive strength and serves to react any external pressure loads acting against the lower portion of the canister 11. Thus, the combination of the thickened wall at the upper empty end of the canister and the waste glass deposited in the remainder of the canister offers sufficient compressive strength to withstand any external pressure loads resulting from dynamic repository conditions.

Figure 2:
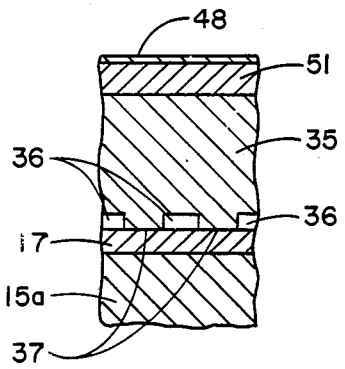
FIG. 2 is a fragmentary sectional view taken along line 2—2 of FIG. 1.

The top wall 17 of canister 11 supports along its periphery a collar assembly, generally designated 32, having an end wall 33 and a cylindrical skirt or sidewall 35. The end wall 33 is provided with a central opening 34 for accommodating the neck 21 of canister 11. As best shown in FIG. 2, the lower end of the skirt 35 has a castellated or tooth-like formation comprising alternating recesses 36 and projections 37. The projections 37 are received in annular recess 25 and suitably affixed thereto, while the recesses 36 define openings in the skirt 35. The collar assembly 32 also houses a thick, circular block of solid filler material 38, preferably lead, cast or otherwise fixedly secured to the end wall 33 and skirt 35 and disposed about the neck 21. The bottom of the block of filler material 38 is slightly spaced above the upper surface of canister top wall 17 to define assembly clearance and an annular passage 40 communicating with the recesses 36 for a purpose that will hereinafter become apparent.

A tapped bushing 41, located within the upper end of inlet 23, is welded to the inner surface of neck 21 after the canister is filled with the waste product to seal the canister closed. The bushing 41 is formed with a tapped opening 42 for receiving the threaded shank 43 of a pintle 45 subsequently utilized for lifting or otherwise handling the waste package by suitable remotely controlled handling apparatus (not shown).

The canister 11 is completely enveloped by the outer shell 12, which comprises a cylindrical side wall 46, a dished, concave bottom wall 47 complementary in shape to the bottom wall 16 of canister 11, and a top closure plate 48 to which is rigidly secured the pintle 45. The top closure plate 48 is welded, as at 50, along its peripheral edge to the shell side wall 46. An annular, titanium backing ring 51 is positioned adjacent the juncture of the closure plate periphery and cylindrical side wall 46 to facilitate welding. The thin outer shell 12 preferably is formed of corrosion resistant titanium to provide the necessary long-term resistance to corrosion and other deleterious effects encountered in underground repository sites.

An important feature of the present invention resides in the provision of a low melting point, self contained, filler material 38 disposed in solid form in the collar assembly 32. After the complete waste package 10 is sealed closed by welding the closure plate 48 onto the shell 12, the upper portion of the package is heated to melt and liquefy the filler material 38 and cause it to flow via passage 40 and the openings defined by recesses 36 into the narrow, annular space 29 between canister 11 and shell 12. In its molten state, the filler material completely fills this annular space, positively eliminating any voids between the canister 11 and shell 12. After heating, the filler material cools and solidifies to provide structural support for the thin shell 12 and stabilize it against buckling or deformation from external pressure loads. Additionally, the metal filler material offers thermal conduction to facilitate the flow of decay heat from canister 11 to shell 12, which is then dissipated into the repository environment. Moreover, the lead filler serves as a gamma and neutron shield for attenuating the neutrons and gamma rays emitted from the radioactive waste material in the canister 11.

In assembling the waste package 10, molten radioactive waste glass material is poured through inlet 23 into the fabricated canister 11 up to the level of stiffener disk 28 with any foaming of the molten glass being accommodated in the volume 26. After filling the canister, the contents are allowed to cool and harden. The canister 11 is then sealed closed by resistance welding the bushing 41 in place within neck 21. The sealed canister 11 can now be inserted into the shell 12.

Figure 4:
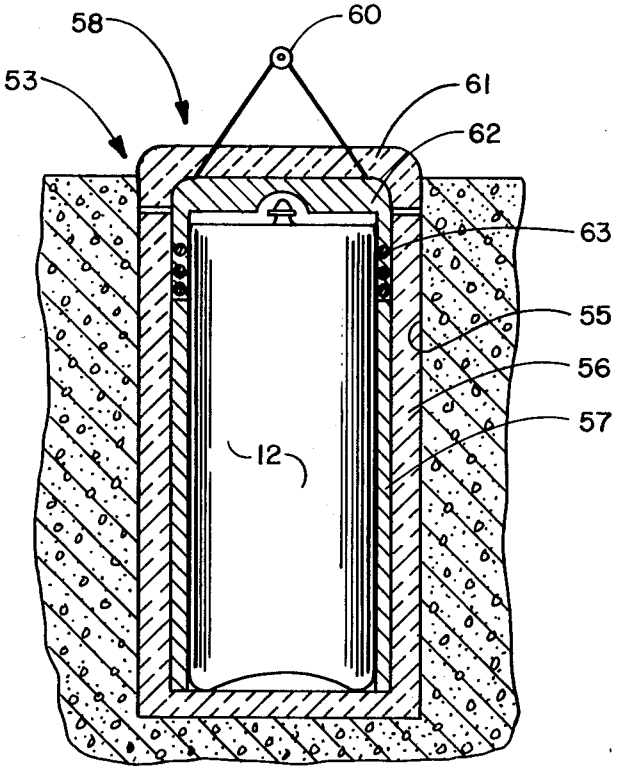
FIG. 4 is a view similar to FIG. 2, showing the final stage of assembly in fabricating the waste package of the present invention.
Figure 3:
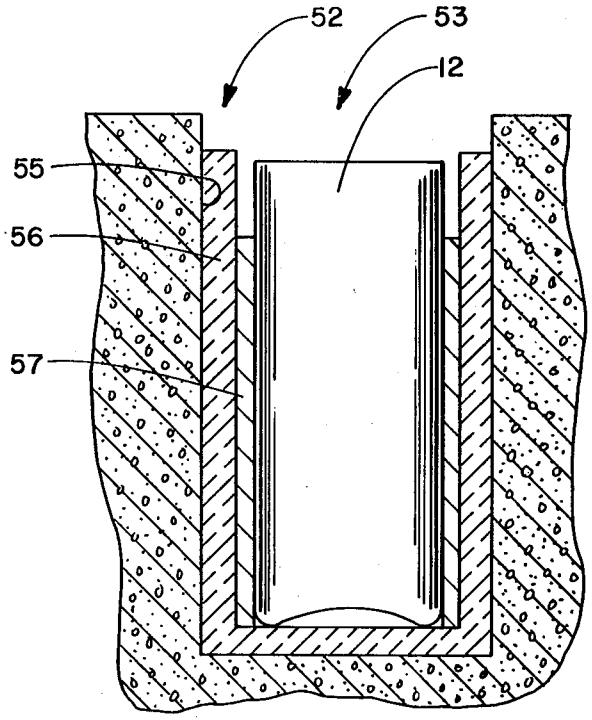
FIG. 3 is a vertical sectional view, showing the initial stage of assembling the waste package of this invention.

As shown in FIGS. 3 and 4, the overpacking operation preferably is accomplished by placing an empty shell 12 in a cylindrical holding fixture, generally designated 52, located in a hot cell. The fixture 52 includes an assembly pit 53 having a cylindrical cavity 55 formed therein. While the assembly pit 53 shown is formed of concrete below the floor level of the hot cell, it should be appreciated that the pit can be formed of other suitable materials including carbon steel and disposed above the cell floor level, if desired. A cylindrical sleeve 56 of suitable insulation is placed in the cavity of pit 53 and, in turn, receives a positioning sleeve 57 for holding and maintaining an empty shell 12 (FIG. 3) in the proper upright attitude. The sealed canister 11, along with the collar assembly 32, is then lowered into the shell 12 with nominal clearance provided between the canister peripheral surface and the inner surface of shell 12 to facilitate easy entry thereinto. The projections 37 of the collar assembly skirt 35 disposed within the annular recess 25 of canister top wall 17 serve to accurately center the collar assembly 32 relative to the canister 11. The top closure plate 48, which includes the pintle 45, is then brought into position and welded onto the shell 12.

After closure is completed, the head or upper portion 58 (FIG. 4) of the fixture 52 is lowered by means of a lifting device 60 into place. This head portion of the fixture 52 includes an insulation cap 61 and a positioning head 62 adapted to mate with the insulation sleeve 56 and positioning sleeve 57, respectively. A heater coil 63 is mounted within the skirt of positioning head 62 and is energized for raising the temperature of the package 10 sufficiently, approximately 400° C., to melt the lead filler material 38. The lead liquefies and flows via passage 40 and recesses 36 into the annular space 51 and completely fills the same to eliminate any voids between the canister 11 and shell 12. Upon completion of this heating step, the head portion 58 is lifted and the package 10, after cooling, is removed from the assembly pit and available for emplacement in an underground repository.

While lead preferably is employed as the filler material because of its low melting point (327° C.) and its gamma and neutron shielding properties, it should be appreciated that any suitable filler material possessing similar properties can be used in lieu of lead, if desired. The reason for liquefying the lead after complete closure is to eliminate any problems associated with lead vapor in an open system.

From the foregoing, it is apparent that the objects of the present invention have been fully accomplished. As a result of this invention, a new and useful self-stabilizing radioactive waste disposal package is provided for meeting all of the requirements of Federal Regulations as to integrity, long-term radionuclide containment, gradual radionuclide release after the containment, and retrievability. By taking advantage of the waste product form, together with the reinforcement of certain portions of the canister, sufficient compressive strength is realized to effectively resist the external crushing forces associated with anticipated dynamic repository conditions. Internal support for the outer shell to preclude buckling or deformation thereof is provided by a self-contained solid filler material convertible after completely sealing the package into a liquid state for filling the space between the canister and shell to positively eliminate any voids therebetween.

The foregoing description of a preferred embodiment of this invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of this invention and its practical application to thereby enable others skilled in the art to utilize the invention in various embodiments and with various modifications as are suited to the particular use contemplated. It is intended that the scope of the invention be defined by the claims appended hereto.

I claim:

1. A waste package comprising: a canister for containing vitrified radioactive waste material, said canister having a side wall, an end wall terminating in a neck for defining an inlet, a closure member sealing said inlet closed, a sealed outer shell completely encapsulating said canister in radially spaced relation to said canister side wall and defining a space therebetween, means adjacent said neck for supporting a metallic filler in solid form, said metallic filler convertible into a liquid state for flow into said space after said outer shell has been sealed and then subsequent hardened to form a solid layer completely occupying said annular space.

2. A waste package according to claim 1, wherein said canister comprises a side wall and opposite end walls, said vitrified radioactive waste material occupying the major portion of said canister from one of said end walls to a predetermined level spaced from said other end wall and offering resistance to external pressure loads.

3. A waste package according to claim 2, wherein said side wall is formed with a reinforced portion extending from said level of vitrified radioactive waste material to said other end wall.

4. A waste package according to claim 1, including means for retaining said vitrified radioactive waste material in a desired shape.

5. A waste package according to claim 4, wherein said retaining means comprises a disk secured about the periphery thereof to said sidewall for confining in conjuction with said sidewall and said one end wall said vitrified radioactive waste material in said desired shape.

6. A waste package according to claim 1, including a collar assembly mounted within said shell about said canister neck.

7. A waste package according to claim 6, said collar assembly supporting said solid filler material prior to converting said filler material into a liquid state.

8. A waste package according to claim 7, wherein said collar assembly comprises a skirt having a castellated edge supported on an external surface of said one end of said canister.

9. A waste package according to claim 8, wherein said castellated edge defines openings establishing communication with said space for flow of said filler material when in a liquid state.

10. A waste package according to claim 1, wherein said shell is formed of a corrosion resistant material.

11. A waste package according to claim 10, wherein said corrosion resistant material is titanium.

12. A waste package according to claim 1, wherein said metallic filler is lead.

* * * * *